United States Patent Office 3,484,399
Patented Dec. 16, 1969

3,484,399
STABILIZATION OF OXYMETHYLENE POLYMERS
Michael J. Kakos, Jr., Metuchen, N.J., assignor to Celanese Corporation, a corporation of Delaware
No Drawing. Filed May 16, 1966, Ser. No. 550,576
Int. Cl. C08g 51/58, 51/62
U.S. Cl. 260—18    12 Claims

ABSTRACT OF THE DISCLOSURE

A polyoxymethylene composition is disclosed and claimed which comprises an oxymethylene polymer and (1) a stabilizing amount of metal salt of non-nitrogenous organic acids and alcohols having from 2 to about 30 carbon atoms and (2) a phenolic stabilizer. The claimed composition does not have an amine-like or fishy odor identified with prior polyoxymethylene compositions thus enabling the claimed compositions to be used in applications such as aerosol cans. The salt may be prepared from alkali or alkaline earth metals, zinc, aluminum, tin and other metals.

---

This invention relates broadly to oxyalkylene polymers and, more particularly, to modified oxyalkylene polymers (both homopolymers and copolymers) having improved physical properties.

Oxyalkylene polymers, specifically oxymethylene polymers having recurring —$CH_2O$— units, have been known for many years. They may be prepared by the polymerization of anhydrous formaldehyde or by the polymerization of trioxane, which is a cyclic trimer of formaldehyde. Oxymethylene polymers (both homopolymers and copolymers) vary in physical properties such as thermal stability, molecular weight, molding characteristics, color and the like, depending, in part, upon their method of preparation.

High-molecular-weight oxymethylene polymers have been prepared by polymerizing trioxane in the presence of certain fluoride catalysts. They may also be prepared in high yields and at rapid reaction rates by the use of catalysts comprising boron fluoride coordination complexes with organic compounds, as described in U.S. Patent No. 2,989,506 of Donald E. Hudgin and Frank M. Berardinelli.

Other methods of preparing oxymethylene polymers are disclosed by Kern et al. in Angewandte Chemie, 73 (6), 177–186 (Mar. 21, 1961), and in Sittig, "Polyacetals: What You Should Know," Petroleum Refiner, 41, 11, 131–170 (November 1962), including polymers containing repeating carbon-to-carbon single bonds in the polymer chain and which are made by copolymerizing trioxane with cyclic ethers, e.g., dioxane, lactones, e.g., betapropiolactone, anhydrides, e.g., cyclic adipic anhydride, and ethylenically unsaturated compounds, e.g., styrene, vinyl acetate, vinyl methyl ketone, acrolein, etc.

Also contemplated in the production of modified oxyalkylene, specifically oxymethylene, polymeric compositions of the instant invention are oxymethylene polymers the end groups of which are reacted or "capped" with, for example, a carboxylic acid or a monomeric ether. Typical capping agents are alkanoic acids (e.g., acetic acid), which form ester end groups, and dialkyl ethers (e.g., dimethyl ether), which form ether end groups.

Still other oxymethylene polymers, more particularly copolymers, which are adapted for use in producing the modified oxymethylene polymers of this invention are those which are prepared as described in U.S. Patent No. 3,027,352 of Walling et al. by copolymerizing, for example, trioxane with any of various cyclic ethers having at least two adjacent carbon atoms, e.g., ethylene oxide, dioxolane, and the like.

It will be apparent to those skilled in the art that these various oxyalkylene polymers (homopolymers and copolymers, which are often designated generically herein merely as "polymers"), have varying physical properties as indicated hereinbefore; and a polymeric composition or article, e.g., a molding composition or molded article, which is satisfactory for one particular end-use may be partly or wholly unsatisfactory for a different end-use.

The present invention provides one solution to the long-existing problem of improving the properties, especially thermal stability, of oxymethylene polymers without causing to be imparted to the polymer the objectionable amine-like or "fishy" odor heretofore encountered. Consequently the field of utility of oxymethylene polymers has been greatly widened and, more particularly, in the manufacture of molded containers such as, for example, blow-molded plastic bottles. Hence the solution to this problem is a matter of considerable practical and economic importance not only to the manufacturer of the oxymethylene polymer but also to the fabricator of the polymer and to the consuming public.

In certain types of plastic containers used for packaging consumer goods, it is important that the container should be odorless and/or impart no odor to the goods packaged therein. Typical examples of such containers are plastic aerosol containers employed in packaging such consumer products as hairsprays, antiperspirants, colognes, perfumes, pharmaceuticals and various other consumer items. The odor has been described as "fishy," that is, amine or amine-like in nature. Although this odor has usually been fugitive, and generally would disappear within several minutes followed by the return of the original odor, nevertheless it was not possible prior to the present invention to persuade the aerosol trade to accept oxymethylene polymers which, during or after fabrication into containers, yielded such odors.

The cause of the odor was not immediately ascertained. It was found only after a long period of research and development work during which I discovered that the odor was due to or derived from the thermal stabilizer (chain-scission inhibitor) then employed. To be more specific, I found that stabilizers or chain-scission inhibitors of the kind commonly employed in oxymethylene polymer compositions, and more particularly nitrogen-containing stabilizers, e.g., polyamides, poly(vinylpyrrolidone), the various acrylamide copolymers, melamine, cyanoguanidine, nitrilotrispropionamide and the like, produced the aforementioned fishy odor in varying but noticeable degrees.

As a result of further studies, it is believed that the described odor is due to a reaction product or products derived from the added nitrogen-containing stabilizer (or, more likely, from both the stabilizer and the polymer) when the oxymethylene polymer is blended under heat with additives to form a colored or uncolored molding composition and/or during blow-molding, injection-molding or otherwise molding the polymeric oxymethylene composition at an elevated temperature. There is some reason to believe that the fishy odor may be due to the presence of a product of the reaction between ammonia and formaldehyde, since it is known that ammonia is generated during the degradation of amines and amides. Whatever the nature of these odor-forming substances may be, the fact remains that the fishy odor is not detectable when nitrogen-containing stabilizers heretofore employed are omitted from the formulation.

Having found the cause of the problem, one might think at first glance that the elimination of the nitrogen-containing stabilizer and the substitution of any of the other known non-nitrogenous thermal stabilizers for oxymethylene polymers, or non-nitrogenous compounds used or suggested for use as thermal stabilizers for other polymers, would be a simple and obvious solution to the problem. The fallacy of such thinking is immediately apparent when it is considered that, in general, nitrogen-containing compounds (e.g., cyanoguanidine) have been more effective and satisfactory thermal stabilizers for oxymethylene polymers than non-nitrogenous compounds. Furthermore, one cannot predict whether or not a compound (nitrogenous or non-nitrogenous) that is a thermal stabilizer for one type of polymer will function as a thermal stabilizer for another type of polymer having a substantially different chemical constitution, different chemical properties and different compatibility and other physical characteristics.

A solution to the problem was further complicated by the fact that the desired non-nitrogenous stabilizer should also be able to stabilize thermally a 20/1 or a 30/1 weight ratio of oxymethylene polymer/colored pigment, respectively, at practical concentrations of the thermal stabilizer. For example, it was found that certain non-nitrogenous stabilizers (outside the scope of those with which this invention is concerned), although adequately effective at, for example, a 0.3% weight concentration in thermally stabilizing an oxymethylene polymer did not satisfactorily prevent decomposition at 450° F. of a plastographed concentrate mix of a 20/1 weight ratio of polymer and colored pigment at this same 0.3% weight concentration of thermal stabilizer. In marked contrast, in order to prevent plastograph excessive degradation of the aforesaid concentrate mix at 450° F., it was necessary to use this non-nitrogenous stabilizer in a concentration of 0.8 weight percent.

In addition to meeting the foregoing requirements, the non-nitrogenous stabilizer should not exude excessively or objectionably (if at all) from the molded or otherwise fabricated oxymethylene polymer; should not cause or promote a build-up of deposit in the mold during molding; and should not impart objectionable color to the polymer or adversely affect its other useful properties so that it would be unsuited for its intended purpose.

The present invention is based on my discovery that thermal stabilization or chain-scission inhibition of an oxymethylene polymer (or mixture of oxymethylene polymers in any proportions) can be effected without imparting to the said polymer or polymeric mixture or blend the above-described amine-like or fishy odor by incorporating therein one or more of the compounds broadly and specifically described below; and to attain this result while meeting the other requirements set forth in the two paragraphs immediately preceding.

It is accordingly a primary object of the present invention to provide oxymethylene polymer compositions which have been stabilized so that they do not degrade excessively under heat (for example, during molding at an elevated temperature); and to obtain such compositions which do not emit an objectionable odor, viz., an amine-like or fishy odor, when heated.

Another object of the invention is to provide compositions having the characteristics described in the preceding paragraph and which do not leave (or cause a build-up of) mold deposits in the mold when molding compositions of the invention are molded (e.g., injection-molded or blow-molded) into shaped articles.

A further object of the invention is to provide shaped articles, e.g., blown containers such as aerosol or other bottles, from the stabilized oxymethylene polymer compositions of the invention.

Still another object of the invention is to provide a method of preparing the herein-described compositions.

Other and further objects of the invention will be apparent to those skilled in the art from the following more detailed description.

The objects of the invention are attained by preparing a composition comprising a substantially homogeneous admixture including (A) a normally solid, oxymethylene polymer having certain particular characteristics, and (B) stabilizing additive including essentially metal salts of a particular kind.

Component (A) of the composition is an oxymethylene polymer which not only is normally a solid but which also is normally substantially water-insoluble. It is further characterized by the fact that, in the absence of a thermal stabilizer, it degrades excessively (that is, for its intended use) when heated to temperatures up to 230° C. It has the additional characteristics that, in the presence of a stabilizing amount of a nitrogen-containing thermal stabilizer, such as those of the amidogen (amine or amide) type, the thusly stabilized polymer emits an objectionable odor, especially when heated up to the aforementioned temperature and higher, for example during molding or under other conditions wherein the nitrogen-containing stabilizer and oxymethylene polymer are combined, or are being combined, in a molten or plastic state.

The stabilizing additive comprising or constituting component (B) of the composition is of the kind and in the amount effective in decreasing the degradation of the polymer of (A) and in the elimination of the aforesaid odor. This additive comprises at least one member of the group consisting of (a) metal salts of non-nitrogenous organic acids, more particularly non-nitrogenous aliphatic acids, having from 2 through 30 carbon atoms and at least one

group, and (b) metal salts of non-nitrogenous alcohols having from 2 through 30 carbon atoms.

The metal salts of (a) and (b) have the further characteristic of being formic acid acceptors.

THE OXYMETHYLENE POLYMER

The oxymethylene polymer that is modified in practicing this invention may be, as previously has been indicated, homopolymeric oxymethylene or an oxymethylene copolymer. The two are not the full equivalent of each other as the main or primary component in the stabilized polymeric compositions of this invention. The preferred primary component is a copolymer of oxymethylene.

The oxymethylene polymers useful in this invention may be prepared as broadly and more specifically described in the second through the sixth paragraphs of this specification and in the citations therein given. An oxymethylene copolymer of the kind disclosed and claimed in the aforementioned Walling et al. patent is especially suitable for use as the copolymer that is modified in producing the stabilized polymeric compositions with which this invention is concerned.

Thus, the oxymethylene copolymer used in carrying this invention into effect may be a polymer having a structure comprising recurring units represented by the general formula (I)

wherein each $R_1$ and $R_2$ is selected from the group consisting of hydrogen, lower alkyl and halogen-substituted lower alkyl radicals, and wherein $n$ is an integer from zero to three, inclusive, and $n$ being zero in from 85% to 99.9% of the recurring units. The oxymethylene copolymer may be defined more specifically as a normally solid, substantially water-insoluble copolymer, the repeating units of which consist essentially of (A) $-OCH_2-$ groups interspersed with (B) groups represented by the general formula (II)

wherein each $R_1$ and $R_2$ is selected from the group consisting of hydrogen, lower alkyl and halogen-substituted lower alkyl radicals, each $R_3$ is selected from the group consisting of methylene, oxymethylene, lower alkyl and haloalkyl-substituted methylene, and lower alkyl and haloalkyl-substituted oxymethylene radicals, and $n$ is an integer from zero to three-inclusive. Each lower alkyl radical perferably has from one to two carbon atoms, inclusive. The —OCH$_2$— units of (A) constitute from 85% to 99.9% of the recurring units. The units of (B) are incorporated into the copolymer during the step of copolymerization to produce the copolymer by the opening of the ring of a cyclic ether having adjacent carbon atoms by the breaking of an oxygen-to-carbon linkage.

Polymers of the desired structure may be prepared by polymerizing trioxane together with from about 0.1 to about 15 mole percent of a cyclic ether having at least two adjacent carbon atoms, preferably in the presence of a catalyst comprising a boron fluoride coordinate complex in which oxygen or sulfur is the donor atom.

In general the cyclic ethers employed in making the oxymethylene copolymer are those represented by the general formula (III) 

wherein each $R_1$ and $R_2$ is selected from the group consisting of hydrogen, lower alkyl and halogen-substituted lower alkyl radicals, and each $R_3$ is selected from the group consisting of methylene, oxymethylene, lower alkyl and haloalkyl-substituted methylene, and lower alkyl and haloalkyl-substituted oxymethylene radicals, and $n$ is an integer from zero to three, inclusive.

The preferred cyclic ethers used in the preparation of the oxymethylene copolymers are ethylene oxide and 1,3-dioxolane, which may be represented by the formula (IV) 

wherein $n$ represents a integer from zero to two, inclusive. Other cyclic ethers that may be employed are 1,4-dioxane, trimethylene oxide, tetramethylene oxide, pentamethylene oxide, 1,2-propylene oxide, 1,2-butylene oxide, 1,3-butylene oxide and 2,2-di-(chloromethyl)-1,3-propylene oxide.

The preferred catalysts used in preparing the oxymethylene copolymers are the aforementioned boron fluoride coordinate complexes, numerous examples of which are given in the previously identified Walling et al. patent. Reference is made to this patent for further information concerning the polymerization conditions, amount of catalyst employed, etc.

The oxymethylene coplymers produced from the preferred cyclic ethers have a structure composed substantially of oxymethylene and oxyethylene groups in a ratio of from about 6 to 1 to about 1000 to 1.

The oxymethylene copolymers described briefly above are members of the broader group of such copolymers that are useful in practicing the present invention and which have at least one chain containing recurring oxymethylene units interspersed with —OR— groups in the main polymer chain. In such —OR— groups, R represents a divalent radical containing at least two carbon atoms linked directly to each other and positioned in the polymer chain between the two valences, with any substituents on said radical being inert, that is, substituents that are free from interfering functional groups and do not induce undesirable reactions under the conditions involved. Among such copolymers that advantageously may be employed in practicing this invention are oxymethylene copolymers containing from about 60 mole percent to 99.9 mole percent of recurring oxymethylene groups to from 0.1 mole percent to about 40 mole percent of —OR— groups, and more particularly from 60:99.6 (e.g., 70:99.6) mole percent of the former to 0.4:40 (e.g., 0.4:30) mole percent of the latter. As indicated hereinbefore, the most preferred copolymers are those having from about 85 mole percent to 99.6–99.9 mole percent of recurring oxymethylene groups and from 0.1–0.4 mole percent of —OR— groups. In a preferred embodiment R may be, for example, an alkylene or substituted alkylene group containing at least two carbon atoms.

Also useful in carrying the instant invention into effect are oxymethylene copolymers having a structure comprising recurring units consisting essentially of those represented by the general formula (V) 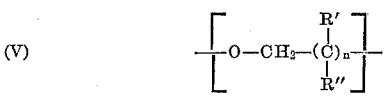

wherein $n$ represents an integer from 0 to 5, inclusive, and representing 0 (zero) in from 60 to 99.6 mole percent of the recurring units; and R' and R'' represent inert substituents, that is, substituents which are free from interfering functional groups and will not induce undesirable reactions. Thus, one advantageously may utilize oxymethylene copolymers having a structure comprising oxymethylene and oxyethylene recurring units wherein from 60 to 99.9 e.g., from 60 or 70 to 99.6 mole percent of the recurring units are oxymethylene units.

It has previously been indicated that especially preferred copolymers employed in practicing the present invention are those containing in their molecular structure oxyalkylene units having adjacent carbon atoms which are derived from cyclic ethers having adjacent carbon atoms. Such copolymers may be prepared by copolymerizing trioxane or formaldehyde with a cyclic ether represented by the general formula (VI)    CH$_2$——O
        |        |
        CH$_2$—(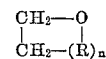)$_n$ wherein $n$ represents an integer from zero to 4, inclusive, and R represents a divalent radical selected from the group consisting of (a) CH$_2$, (b) CH$_2$O, and (c) any combination of CH$_2$ and CH$_2$O.

Examples of specific cyclic ethers that may be used in preparing copolymers of the kind embraced by Formula VI, in addition to the cyclic ethers previously mentioned with reference to the copolymers embraced by Formula IV, and of acetals and cyclic esters that may be employed instead of cyclic ethers, are 1,3-dioxane, 1,3,5-trioxepane, beta-propiolactone, gamma-butyrolactone, neopentyl formal, pentaerythritol diformal, paraldehyde, tetrahydrofuran and butadiene monoxide. In addition, glycols including, for example, ethylene glycol, diethylene glycol, 1,3-butylene glycol, propylene glycol and the like may be employed instead of the cyclic ethers, acetals and esters just mentioned.

Although formaldehyde is a desirable source of the oxymethylene moiety (i.e. R$_2$O wherein R$_2$ represents methylene or substituted methylene), it will be understood of course, by those skilled in the art that instead of formaldehyde other sources of the oxymethylene moiety may be used, e.g., paraformaldehyde, trioxane, acetaldehyde, propionaldehyde, acetone, and the like. One may also employ cyclic acetals, e.g., 1,3,5-trioxepane, in lieu of both the cyclic ether and formaldehyde.

The term "oxymethylene" as used in the specification and claims of this application, unless it is clear from the context that a more specific meaning is intended, includes substituted oxymethylene, wherein the substituents are inert with respect to the reactions in question; that is, the substituents are free from any interfering functional group or groups that would cause or result in the occurrence of undesirable reactions.

Also, as used in the specification and claims of this application, the term "copolymer" means polymers obtained by copolymerization of two or more different monomers (i.e. polymers containing in their molecular structure two or more different monomer units), and includes terpolymers, tetrapolymers and higher multicomponent polymers. The term "polymer" (unless it is clear from the context that the homopolymer or a copolymer is intended) includes within its meaning both homopolymers and copolymers.

In some cases it is especially desirable to use oxymethylene terpolymers as the oxymethylene polymer component of the compositions of this invention, e.g., in making molding compositions especially adapted for use in making blow-molded or otherwise shaped articles, e.g., bottles or other types of containers. Oxymethylene terpolymers that are particularly useful in such applications, as well as for other purposes, include those disclosed in copending U.S. application Ser. No. 444,787, filed Apr. 1, 1965 (now abandoned), by W. E. Heinz and F. B. McAndrew, assigned to the same assignee as the instant invention, and which by this cross-reference is made a part of the disclosure of the present application. The aforesaid copending application Ser. No. 444,787 is a continuation-in-part of application Ser. No. 229,715, filed Oct. 10, 1962 (now abandoned), which in turn is a continuation-in-part of application Ser. No. 153,720, filed Nov. 20, 1961 (also now abandoned).

The oxymethylene polymers that are modified to produce the compositions of this invention are thermoplastic materials having a melting point of at least 150° C., and normally are millable or processable at a temperature of about 200° C. They have a number average molecular weight of at least 10,000. The preferred oxymethylene polymers have an inherent viscosity of at least 1.0 (measured at 60° C. in a 0.1 weight percent solution in p-chlorophenol containing 2 weight percent of alpha-pinene).

The oxymethylene polymer component of the compositions of this invention may be, if desired, oxymethylene polymers that have been preliminarily stabilized to a substantial degree, prior to admixture with stabilizing additive (including a particular kind of metal salt), to produce the compositions of this invention. Such stabilizing technique may take the form of stabilization by degradation of the molecular ends of the polymer chain to a point where a relatively stable carbon-to-carbon linkage exists at each end. For example, such degradation may be effected by hydrolysis as disclosed in the copending application of Frank M. Berardinelli, Ser. No. 372,390, filed June 3, 1964, as a continuation-in-part of application Ser. No. 102,097, filed Apr. 11, 1961, now abandoned. Application Ser. No. 372,390 is assigned to the same assignee as the present invention, and by this cross-reference is made a part of the disclosure of the instant application.

Catalysts suitable for use in polymerizing trioxane or formaldehyde alone or with other copolymerizable components in producing the oxymethylene polymers that are modified to produce the thermally stabilized polymer compositions of this invention may be widely varied. Preferred catalysts are cationic catalysts, including such inorganic fluorine-containing catalysts as boron trifluoride, antimony trifluoride, antimony fluoroborate, bismuth trifluoride, bismuth oxyfluoride, nickelous fluoride, aluminum trifluoride, titanium tetrafluoride, manganous fluoride, manganic fluoride, mercuric fluoride, silver fluoride, zinc fluoride, ammonium bifluoride, phosphorous pentafluoride, hydrogen fluoride, and compounds containing these materials, such as boron fluoride coordinate complexes with organic compounds, particularly those in which oxygen or sulfur is a donor atom.

Other suitable catalysts include thionyl chloride, fluorosulfonic acid, methanesulfonic acid, phosphorous trichloride, titanium tetrachloride, ferric chloride, zirconium tetrachloride, aluminum trichloride, stannic chloride and stannous chloride.

The particularly preferred catalysts are boron fluoride and boron fluoride-containing materials, such as boron fluoride monohydrate, boron fluoride dihydrate and boron fluoride trihydrate as well as boron fluoride coordinate complexes with organic compounds as mentioned previously.

As indicated earlier in this specification, it is also within the purview of this invention to utilize oxymethylene polymers, including homopolymers of trioxane or of formaldehyde, the molecules of which have been "end capped" by known methods of etherification or of esterification.

THE STABILIZING ADDITIVE

The stabilizing additive which is blended or otherwise admixed with the oxymethylene polymer to form the compositions of this invention includes as an essential component of the admixture one or more metal salts of (A) a non-nitrogenous organic acid having from 2 through 30 carbon atoms and at least one

group (preferably, also, at least one primary, secondary or tertiary alcoholic hydroxyl group); and/or (B) one or more metal salts of non-nitrogenous alcohols (primary secondary or tertiary alcohols) having from 2 through 30 carbon atoms. The metal salts of (B) are often designated as alcoholates. As previously has been mentioned, the metal salts of both (A) and (B) are characterized as being formic acid acceptors.

The metal salts used in practicing this invention are either commercially available or can be produced in known manner. Advantageously the cation of such salts is an alkali metal (sodium, potassium, lithium, rubidium or cesium) or an alkaline-earth metal. The term "alkaline-earth metal," as used in this specification and in the appended claims, includes within its meaning not only calcium, strontium and barium but also magnesium, which latter element is sometimes excluded, in chemical textbooks and publications, from the alkaline-earth family of metals. Other salts that may be used (especially in combination with alkali-metal or alkaline-earth-metal salts) are those wherein the cation is, for example, beryllium, zinc, aluminum, titanium, germanium, zirconium or tin. The available evidence indicates that optimum thermal stabilization of the oxymethylene polymer is obtained when the cation is one which forms a relatively strong base as do the alkali metals and the alkaline-earth metals.

The metal salt component of the stabilized polymer composition may be one or more metal salts of the aforementioned non-nitrogenous organic acids and/or one or more metal salts of the aforesaid non-nitrogenous alcohols. The organic acid may be monobasic or polybasic, saturated or unsaturated, branched-chain or straight-chain, and substituted or unsubstituted provided that any substituent or substituents are inert during formulation; that is, are free from any interfering functional group or groups that would cause or result in the occurrence of undesirable side reactions. For example, —OH groups are permissible substituents; and, in fact, the available evidence indicates that they are desirable. Or, the substituent may be, for instance a —OR group where R represents an alkyl radical such as a lower alkyl radical, specifically a $C_1$ through $C_5$ alkyl radical.

Illustrative examples of non-nitrogenous organic acids that may be employed in producing the aforementioned metal salts are the unsubstituted, straight-chain, saturated, aliphatic, monocarboxylic acids having from 2 through 30 carbon atoms, viz., ethanoic, propanoic, butanoic and higher members of the homologous series through triacontanoic (melissic), $C_{29}H_{59}COOH$; the corresponding branched-chain, saturated, aliphatic, monocarboxylic acids, e.g., alphamethylbutyric (2-methylbutanoic), isovaleric (3-methylbutanoic), pivalic (2,2-dimethylpropanoic) and 2-ethylhexoic (octoic); the monoethylenically unsaturated, aliphatic, monocarboxylic acids having up to and including about 30 carbon atoms, e.g., 4-decenoic, caproleic, 10-undecenoic, lauroleic, 5-tetradecenoic, myristoleic, palmitoleic, cis-6-octadecenoic, trans-6-octadecenoic, oleic, elaidic, trans-11-octadecenoic, cis-9-eicosenoic, 11-docosenoic, erucic, brassidic, cis-15-tetracosenoic, and 17-hexacosenoic.

Still other examples of useful non-nitrogenous organic acids that may be employed in making the metal salts are the di-, tri- and higher polyethylenically unsaturated aliphatic, monocarboxylic acids having up to and including about 30 carbon atoms, e.g., sorbic, linoleic, linolelaidic, hiragonic, α-eleostearic, β-eleostearic, punicic, linolenic, elaidolenic, pseudoeleostearic, moroctic, α-parinaric, β-parinaric, arachidonic, clupanodonic and nisinic.

As indicated hereinbefore, the metal salts of hydroxy-substituted carboxylic acids having up to and including 30 carbon atoms have been found to be particularly suitable for use in practicing this invention and are not the full equivalent of the other metal salts. The metal ricinoleates, more particularly the ricinoleates of the alkaline-earth metals, and specifically calcium ricinoleate, are outstanding in their utility as a modifier of an oxymethylene polymer.

Ricinoleic acid,

is therefore the preferred hydroxy-substituted carboxylic acid, the metal salt of which is especially valuable in carrying the instant invention into effect. Additional specific examples of other acids of this same sub-group that similarly may be employed are alpha-hydroxydecanoic, 3-hydroxydecanoic acid having the formula

12-hydroxydodecanoic (sabinic), 16-hydroxyhexadecanoic (juniperic), 10-hydroxyhexadecanoic, 12-hydroxyoctadecanoic, 10-hydroxy-8-octadecenoic, DL-erythro-9,10-dihydroxyoctadecanoic and lanoceric acids.

Illustrative examples of other substitued non-nitrogenous organic acids, the metal salts of which may be employed in practicing this invention, are the various keto-substituted aliphatic monocarboxylic acids, e.g. pyruvic, acetoacetic, 4-oxooctadecanoic, 6-oxooctadecanoic, 10-oxooctadecanoic, 17-oxooctadecanoic, 13-oxodotriacontanoic, 13-oxohexatetracontanoic, alpha-licanic, 6,7-dioxooctadecanoic and 9,10-dioxooctadenoic acids.

Examples of still other monocarboxylic acids that may be used in making the metal salts are the various aromatic monocarboxylic acids, e.g., benzoic acid, ortho-, meta- and para-toluic acids, the various hydroxy-substituted toluic acids including the 2- and 3-para-toluic acids, etc.; the aryl-substituted aliphatic monocarboxylic acids, e.g., phenylacetic (alpha-toluic) acid, etc.; dihydroxy monocarboxylic acids, e.g., glyceric acid; and others up to 30 carbon atoms (preferably up to not more than about 20 carbon atoms), that will be apparent to those skilled in the art from the foregoing illustrative examples.

Instead of using metal salts of monobasic acids, one may employ metal salts of di-, tri- and higher polybasic acids. Examples of such acids are the saturated dicarboxylic acids having from 2 through 30 carbon atoms, including oxalic, malonic, succinic, glutaric, adipic, pimelic, suberic, sebacic, azelaic and higher members of the homologous series up to and including about 30 carbon atoms; tricarballylic and other higher polycarboxylic acids; ethylenically unsaturated polybasic acids, e.g., fumaric, maleic, itaconic, citraconic, mesaconic and aconitic acids; aromatic polycarboxylic acids, e.g., phthalic, terephthalic, isophthalic and chlorophthalic acids; and the various hydroxy-substituted polycarboxylic acids, e.g., citric, tartronic, malic, tartaric, dihydroxysuccinic, saccharic, mucic, etc.; as well as other acids having from 2 up to about 30 carbon atoms that will be apparent to the skilled chemist from these illustrative examples.

Illustrative examples of non-nitrogenous alcohols of which the metal salts or alcoholates can be made and used in practicing this invention are those alcohols which are free from a carboxyl

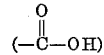

group or groups, but otherwise correspond to the carboxylic acids hereinbefore given by way of illustration. Among such alcohols may be mentioned the straight-chain and branched-chain, saturated, monohydric alcohols, such as ethanol and the normal and isomeric forms of propanol through triacontanol; and the mono-, di- and higher polyethylenically unsaturated monohydric alcohols corresponding to the aforementioned saturated monohydric alcohols including, for example, allyl, methallyl, crotyl, cinnamyl, alpha-phenylallyl, 3-buten-2-ol, 1-penten-3-ol, 3-penten-2-ol, 4-penten-1-ol, 4-penten-2-ol, 3-ethyl-5-hexen-3-ol and higher members of the homologous series.

Still other examples include the non-nitrogenous alcohol-ethers, e.g., the monoethyl, -butyl, -phenyl, and -benzyl ethers of ethylene glycol and of diethylene glycol, proplyene glycol monomethyl ether, pentylene glycol monoethyl ether, decylene glycol monophenyl ether and dibutylene glycol monobutyl ether.

Other specific examples include the various non-nitrogenous polyhydric alcohols containing up to about 30 carbon atoms, e.g., ethylene glycol, diethylene glycol, triethylene glycol, tetraethylene glycol, hexamethylene glycol, decamethylene glycol, 2-ethyl-1,3-hexanediol, 1,3-butylene glycol, pentaethylene glycol, heptaethylene glycol, octaethylene glycol, decaethylene glycol, 2-butyl-1,3-octanediol, 2-ethyl-2-methylol-1-hexanol, 6-methyl-2,4-heptanediol, glycerol, erythritol, pentaerythritol, dipentaerythritol, adonitol, xylitol, arabitol, mannitol, dulcitol, sorbitol, trimethylolpropane, cocceryl alcohol, and others that will be apparent to those skilled in the art from the foregoing illustrative examples.

The use of metal salts of non-nitrogenous ethynoid (acetylenically unsaturated) aliphatic carboxylic acids and metal salts of ethynoid alcohols, which salts are available or can be prepared, is not precluded in producing the stabilized oxymethylene polymer composition of this invention. Also within the scope of this invention is the use of the alkali-metal, alkali earth-metal and other metal salts of alicyclic (e.g., naphthenic) compounds containing at least one carboxylic acid group and/or at least one alcoholic hydroxyl group.

The kind and amount of stabilizing additive which is incorporated in the oxymethylene polymer has been functionally described hereinbefore, and it has been pointed out that it comprises at least one member of the group consisting of the aforementioned metal salts of non-nitrogeneous organic acids and metal salts of non-nitrogeous alcohols. More particularly it may be stated that the metal-salt component of the stabilizing additive is a small, positive, stabilizing amount up to about 5 percent by weight of the oxymethylene polymer, e.g., from 0.001 to 5 percent, and still more particularly 0.01 to 3 percent by weight of the polymer. The preferred amount of the metal component is a stabilizing amount (e.g., 0.01–0.05%) up to 1.5 percent by weight of the oxymethylene polymer. Higher amounts, such as percentages of the order of 3 to 5 weight percent of the monomer, may sometimes be necessary or desirable in stabilizing pigmented oxymethylene polymer concentrates, the amount varying depending upon, for example, the acidic characteristics of the particular pigment employed.

Preferably the stabilizing additive employed in practicing this invention includes an antioxidant ingredient, such as a phenolic antioxidant, in addition to the aforementioned metal components. Useful antioxidants are the various substituted bisphenols and, more particularly, the alkylene bisphenols, including compounds having from 1 to 4 carbon atoms in the alkylene grouping and from zero to two alkyl substituents on each benzene ring, each of said alkyl substituents containing from 1 to 4 carbon atoms. A preferred alkylene bisphenol is 2,2'-methylene bis(4-methyl-6-tertiarybutylphenol). Suitable phenolic antioxidants other than the alkylene bisphenols include 2,6-di-(tertiary-butyl)-4 - methylphenol, p-phenylphenol and octylphenol.

The amount of the phenolic antioxidant, e.g., an alkylene bisphenol, when included in the stabilizing additive, is usually employed in an amount not exceeding about 5 weight percent, more particularly from 0.05 to about 2.0 percent of the oxymethylene polymer. A preferred range of phenolic antioxidant is from about 0.1 to about 1.0%, still more preferably from 0.3 to 1.0%, by weight of the polymeric oxymethylene.

The stabilized polymeric compositions of this invention are prepared by admixing the ingredients thereof in any suitable manner whereby a substantially homogeneous composition is obtained. For example, the stabilizing additive comprised of the above-described metal-salt component and/or antioxidant ingredient may be incorporated into the oxymethylene polymer by dissolving both the polymer and the stabilizer-additive component(s) in a common solvent, and thereafter evaporating the solution to dryness. Alternatively, the stabilizer-additive component(s) may be incorporated into the polymer by applying a solution of the thermal stabilizer to finely divided polymer, as in a slurry, and thereafter filtering the polymer and evaporating it to dryness.

Another suitable method of admixing the components of the composition, especially when the stabilizer additive is a dry solid, is to blend said additive into the plastic polymer while the latter is being kneaded, e.g., on heated rolls or during passage through screw-type or other type of mixer-extruder apparatus. Or, when the stabilizer additive is a finely divided solid, it may be blended with the finely divided polymer in any suitable blending apparatus until a substantially homogeneous composition results.

The thermally stabilized compositions of this invention may also include, if desired, plasticizers, fillers, pigments, or other stabilizers such as those which are stabilizers against degradation by ultraviolet (U.V.) light. Thus, the oxymethylene polymer may be stabilized against such light degradation by incorporating therein a U.V. light-stabilizing amount of a 2-hydroxybenzophenone, e.g., about 1% by weight of 2,2'-dihydroxy-4,4'-dimethoxybenzophenone.

The modified oxymethylene polymer compositions obtained by practicing the present invention are characterized by exhibiting a greater degree of thermal stability than do the corresponding unmodified compositions, and more particularly, those compositions which contain no non-nitrogeneous metal salt (chain-scission inhibitor) of the kind used in practicing this invention but which are otherwise the same.

The preferred starting oxymethylene polymers which are modified to obtain the compositions of this invention have a relatively high thermal stability for this type of polymer even before modification in accordance with the present invention; but, as indicated in the preceding paragraph, this initial stability of the polymer is markedly improved by the modification.

In general, the thermal stability of the additive-modified oxymethylene polymer compositions of this invention in which has been incorporated a non-nitrogenous thermal stabilizer is comparable with the thermal stability of polymeric oxymethylene compositions which are the same as those of this invention except that a nitrogenous stabilizer (e.g., cyanoguanidine or a combination of cyanoguanidine and melamine) is used instead of the non-nitrogenous metal salts required in the applicant's compositions. For example, the starting or unmodified oxymethylene polymer may, when it is a copolymer, have a degradation rate ($K_d$) over the first 45 minutes of heating at 230° C. greater than 1 weight percent/minute (or even greater than 3 weight percent/minute with some copolymers, and even higher than this latter value in the case of homopolymers). In marked contrast, the modified polymer compositions of this invention usually have a $K_d$ value, when heated as briefly described in the preceding sentence, of less than 0.1 weight percent/minute; and values as low as 0.005 weight percent/minute have been obtained with a particular concentration of a preferred metal salt, viz., an alkaline earth-metal salt of an aliphatic carboxylic acid having an alcoholic hydroxyl substituent in the aliphatic chain, and by which is meant specifically calcium ricinoleate.

(Parenthetically it may here be mentioned that the heating of the polymer mentioned in the preceding paragraph, and in examples that follow with reference both to a determination of $K_d$ value and a 5½-hour weight loss, is carried out at 230° C. in a circulating air oven in which the samples are maintained in open dishes on a turntable rotating at 3 r.p.m. and in which the samples may be weighed without removal from the oven.)

In addition to the above-described thermal-stability improvement that is characteristic of the modified oxymethylene polymers of the invention as compared with the unmodified polymers, a further plus factor is that these results are obtained without imparting to the composition the aforementioned amine-like or fishy odor that results upon heating prior-art compositions containing an amidogen-containing thermal stabilizer; and without causing an objectionable mold deposit to build up in the mold when molding the compositions of this invention. Furthermore, the new compositions generally show low MX (processing) discoloration, and can be extruded or otherwise shaped into articles having an improved surface finish as compared with similar compositions wherein the thermal stabilizer is a nitrogen-containing compound of the amidogen type.

It is preferred that the stabilizing additive employed in practicing this invention be a normal or full metal salt of the defined non-nitrogenous organic acid or alcohol. However, the use of partial salts also is contemplated, that is, metal salts of the defined acids and alcohols wherein only part (e.g., ½, ⅓, ⅔, ¼, ¾, etc.) of the total carboxylic and/or alcoholic groups of the acid, alcohol or acid-alcohol have been reacted to form a salt thereof. When such partial salts are used, then ordinarily a larger amount of stabilizing additive is required in order to attain the same degree of thermal stabilization.

In order that those skilled in the art may better understand how the present invention can be carried into effect, the following examples are given by way of illustration and not by way of limitation. All parts and percentages are by weight unless otherwise stated.

EXAMPLE 1

The oxymethylene polymer (acetal polymer) used in this example is a trioxane-ethylene oxide copolymer containing about 2 weight percent (about 1 mole percent) of monomeric units derived from ethylene oxide. It is prepared as previously has been broadly described herein and more specifically in the cited art, e.g., the aforementioned Walling et al. Patent No. 3,027,352. It is in flake form, and about 70% of the copolymer passes through a 40-mesh screen. It has an inherent viscosity (I.V.) of about 1.2 (measured at 60° C. in 0.1 weight percent solution in p-chlorophenol containing 2 weight percent of alpha-pinene). It has a melt index of about 9.0. (The apparatus used and method of determining melt index are described in ASTM D–1238–57T.)

Two compositions, A and B, are prepared, differing only in the concentration of the non-nitrogenous thermal stabilizer employed, viz., calcium ricinoleate (CaR). Composition A is prepared in proportions such that there is admixed with the copolymer 0.1% by weight thereof of CaR and 0.5%, by weight of the copolymer, of a phenolic antioxidant, specifically 2,2'-methylene bis(4-methyl-6-tertiarybutylphenol). Composition B differs only in that it contains 0.2% instead of 0.1% CaR based on the weight of the oxymethylene copolymer. The calcium ricinoleate (normal salt) is commercially available as a finely divided powder in about 98% purity, M.P. 85° C. As available, its fineness is such that 100% passes through an 80-mesh screen (United States Standard sieve series No.), about 86% through a 200-mesh screen, and about 79% through a 325-mesh screen.

The individual compositions are prepared by thoroughly admixing together the flake polymer and modifying components by tumbling the constituents in a blending unit, more particularly a Henshel blending unit, for 30 minutes at 30 r.p.m. The dry substantially homogeneous admixture of the components is extruded through a 1¾" extruder using a melt temperature between about 380° F. and 420° F., and a die temperature of 410° F. The extruded material is then made into small pellets, about ⅛" x ⅛" in average size.

Samples of pellets of both compositions are tested for their degradation rate in air at 230° C. using the procedure that previously has been described. The results are summarized below:

| | $K_d$, wt. percent/min. | 5½ hours weight loss, percent |
|---|---|---|
| Composition A | 0.009 | 10.2 |
| Composition B | 0.008 | 8.5 |

In marked contrast, when the unstabilized copolymer is similarly processed and tested, it shows a $K_d$ value of greater than 1 wt. percent/minute.

The following quick, useful test for screening various polymers (including stabilized oxymethylene polymers) for odors has been developed and used in all examples herein given.

After carrying out a $K_d$ test, the aluminum test dish that is employed to hold the sample is pulled away from the sample and the newly-generated surface is smelled immediately. If there is any objectionable odor, such as an amine-like or fishy odor, it will be detected at once and with no doubt whatsoever as to its presence.

No fishy odor is detected when pellets of compositions A and B are tested as described above. In marked contrast, the same oxymethylene copolymer modified with 0.5% by weight thereof of the same phenolic antioxidant, and with a thermal stabilizer consisting of 0.1% cyanoguanidine and 0.03% melamine, based on the weight of the copolymer (i.e., a composition exemplary of the prior-art compositions) gives a positive amine-like or fishy odor when similarly tested. Further a mold deposit builds up in the mold when this composition is molded whereas compositions A and B do not.

EXAMPLE 2

Same as in Example 1 with the exception that homopolymeric oxymethylene is employed. Again, no fishy odor is detected in the modified compositions, and the thermal stability (as evidenced by the $K_d$ value) is materially lower than that of the unmodified homopolymer.

EXAMPLE 3

This example illustrates the results of preparing and testing individual compositions containing calcium ricinoleate or a salt from a group of twenty-one (21) other metal salts of non-nitrogenous organic acids having at least one carboxylic radical; and, in some cases, at least one carboxylic acid group and at least one alcoholic hydroxyl group. The oxymethylene polymer is an oxymethylene copolymer of the same kind used in Example 1. In all cases the metal salts are normal salts.

As in the other examples, the values given in the following Table I for $K_d$ refer to weight percent loss per minute over a 45-minute period of heating at 230° C., and the 5½-hour weight loss percent also is a measurement determined at 230° C. as previously has been described.

In the 3–A compositions of Table I a combination of cyanoguanidine and melamine in the proportions employed in Example 1 is used as a stabilizer to provide a standard or reference composition for comparative evaluation of the non-nitrogenous metal salts being tested.

As in Examples 1 and 2, the same phenolic antioxidant, viz., 2,2'-methylene bis(4-methyl-6-tertiary-butylphenol), is incorporated into the oxymethylene polymer in an amount corresponding to 0.5% by weight thereof.

The compositions are prepared for testing by kneading the mixture of components in a Brabender unit (manufactured by C. W. Brabender Instruments, Inc., South Hackensack, N.J.). The solidified chunks of modified oxymethylene copolymer are then cut into pellet-size samples for degradation tests.

Table I follows. The values actually obtained for the 5½-hour weight losses are reported in this table to the nearest whole number.

TABLE I

| No. | Stabilizer | .1% Conc. $K_d$ | .1% Conc. 5½ hr. wt. loss, percent | .05% Conc. $K_d$ | .05% Conc. 5½ hr. wt. loss, percent | .01% Conc. $K_d$ | .01% Conc. 5½ hr. wt. loss, percent |
|---|---|---|---|---|---|---|---|
| 3–A | Cyanoguanidine | .011–.015 | 7–15 | .012 | 7 | .011 | 7 |
| 3–B | Mg stearate | .021 | 13 | | | | |
| 3–C | Ca stearate | .012 | 10 | | | .009 | 25 |
| 3–D | Sr stearate | .014 | 14 | .013 | 12 | | |
| 3–E | Ba stearate | .012 | 13 | .014 | 11 | .009 | 9 |
| 3–F | Ca hydroxystearate | .017 | 13 | | | | |
| 3–G | Ba hydroxystearate | .020 | 11 | | | | |
| 3–H | Ca oleate | .014 | 12 | | | | |
| 3–I | Ca ricinoleate | .013 | 9 | .013 | 10 | .008 | 9 |
| 3–J | Li ricinoleate | .059 | 26 | | | | |
| 3–K | Na ricinoleate | .059 | 21 | | | | |
| 3–L | Al ricinoleate | .34 | | | | | |
| 3–M | Na ricinoleate | .059 | 21 | | | | |
| 3–N | Na undecylenate | .060 | 31 | | | | |
| 3–O | Na succinate | .019 | 23 | | | .018 | 10 |
| 3–P | Na benzoate | .048 | 35 | | | | |
| 3–Q | Na citrate | .027 | 19 | | | | |
| 3–R | K citrate | .036 | 23 | | | | |
| 3–S | K glucuronate | .067 | 15 | | | .064 | 27 |
| 3–T | Ca citrate | | | | | .032 | 32 |
| 3–U | Ca gluconate | .016 | 10 | | | .013 | 12 |
| 3–V | Ca tartrate | | | | | .050 | 34 |
| 3–W | Pb stearate | .045 | | | | | |

No amine-like or fishy odor is detected when stabilized polymer compositions 3–B through 3–W are tested for odor in the manner previously described. In marked contrast, composition 3–A containing cyanoguanidine as a thermal stabilizer gives a strongly positive fishy odor when similarly tested.

EXAMPLE 4

In this example certain of the stabilizers employed in Example 3 are evaluated at 0.01% concentration as thermal stabilizers of an oxymethylene copolymer of the same kind used in Examples 1 and 3 with the exception that it has been pigmented. The pigment is admixed directly with the natural resin (i.e., oxymethylene copolymer) when incorporating the stabilizing additives.

The polymer employed is an oxymethylene copolymer of the same kind used in Examples 1 and 3. In addition to the specified metal salt the individual compositions also contain 0.5%, by weight of the copolymer, of the same phenolic antioxidant used in the other examples. Table II follows:

TABLE II

| No. | Stabilizer | 0.01% Conc. in CS-3067A Red* | |
|---|---|---|---|
| | | $K_d$ | 5½ hr. wt. loss, percent |
| 4-A | Ca stearate | 0.021 | 20 |
| 4-B | Ba stearate | 0.018 | 23 |
| 4-C | Ca ricinoleate | 0.012 | 25 |
| 4-D | Na succinate | 0.027 | 20 |
| 4-E | Ca tartrate | 0.098 | 49 |

*CS-3067A Red is the Color No. After mixing the concentrate with the natural resin, the mix contains 0.4% calcium lithopone and 0.2% dye toner—more particularly azo dye toner.

The compositions of this example also are tested for odor as described in Example 1. No fishy or amine-like odor is detected in any of the stabilized compositions.

EXAMPLE 5

This example illustrates the results of thermally stabilizing and concurrently eliminating the aforementioned fishy odor from oxymethylene polymer when modified with a nitrogenous thermal stabilizer of the amidogen type, using a different starting oxymethylene polymer than that used in Examples 1–4. The oxymethylene polymer employed in this example is a terpolymer of the kind disclosed in the aforementioned abandoned Heinz et al. copending application Ser. No. 444,787. More particularly it is a terpolymer of 100 parts trioxane, 2 parts ethylene oxide and 0.05 part butanediol diglycidyl ether.

The metal salts tested include calcium ricinoleate in concentrations of 0.1, 0.5 and 1.0% by weight of the terpolymer, 0.1% lithium ricinoleate, and 0.2% of each of calcium stearate, barium stearate, calcium malonate, calcium oleate, zinc stearate, and mixed stearate (about 50% of each) of calcium and tin.

The modified oxymethylene polymer compositions of this example also contain 0.5%, by weight of the terpolymer, of the same phenolic antioxidant employed in the preceding examples.

Degradation characteristics are obtained on plastographed mixes. Such mixes are prepared as follows:

The flake copolymer and the stabilizer additives are dry-blended in a Waring Blendor, mixing being effected at high speed for two minutes. The resulting blend is added to the bowl of a Brabender blending unit which has been preheated to 400° F. After the powdery material has fluxed to a viscous melt, mixing is continued for ing unit in the form of a string. After this string has 30 minutes with the rotors turning at about 40 r.p.m. Thereafter the melt is pulled from the bowl of the blend- cooled to a hard, plastic mass, it is cut into small pieces about ½" x ½" in size. These specimens are then used for making degradation measurements ($K_d$ and 5½-hour weight loss) as previously has been described.

The results of degradation tests are summarized in Table III. As in Example 1, for reference or comparision purposes there is included in the evaluation a sample of the same oxymethylene terpolymer modified with 0.5%, by weight thereof, of the same phenolic antioxidant, and with a thermal stabilizer consisting of 0.1% cyanoguanidine and 0.03% melamine, based on the weight of the terpolymer.

Table III follows:

TABLE III

| No. | Stabilizer and Percent used | Weight Loss | | Resin Color |
|---|---|---|---|---|
| | | $K_d$, percent/min. | 5½ hr., percent | |
| 5-A | 1.0 Ca ricinoleate | 0.008 | 14 | Dark Brown. |
| 5-B | 0.5 Ca ricinoleate | 0.005 | 10 | Light Brown |
| 5-C | 0.1 Ca ricinoleate | 0.015 | 12 | White. |
| 5-D | 0.1 Li ricinoleate | 0.030 | 31 | Brown. |
| 5-E | 0.2 Ca stearate | 0.014 | 25 | White. |
| 5-F | 0.2 Ca-Sn stearate | 0.010 | 50 | Do. |
| 5-G | 0.2 Ba stearate | 0.010 | 14 | Do. |
| 5-H | 0.2 Ca malonate | 0.011 | 30 | Do. |
| 5-I | 0.2 Ca oleate | 0.010 | 21 | Light Brown |
| 5-J | 0.2 Zn stearate | 0.074 | | White. |
| 5-K | 0.1 cyanoguanidine+0.03 melamine. | 0.10 | 8 | Do. |

When the above compositions are tested for the presence of an amine-like or fishy odor in the manner previously described, composition 5–K containing, by weight of the terpolymer, 0.1% cyanoguanidine and 0.03% melamine gives a strongly positive fishy odor. In marked contrast, when the oxymethylene polymer compositions containing the specified metal salts in the stated percentages are tested in the same manner, no fishy odor is detected. Furthermore, when composition 5–K is molded a deposit builds up or tends to build up in the mold; but no such deposition takes place when compositions 5–A through 5–J are similarly molded.

The formation of, or tendency to form, mold deposits is often indicated by surface irregularities in the molded article. Such irregularities may cause the article to lack customer or sales appeal, or result in failure of the article to meet specification tolerances. Hence any means, e.g., those provided by practicing the present invention, which can enhance the appeal of the molded article to the purchaser or the ultimate consumer is a matter of considerable commercial and economic importance both to the producer of the molding composition and to the molder or fabricator of the said composition.

EXAMPLE 6

This example illustrates the production of molded articles, more particularly injection-molded articles, from molding (moldable) compositions of the invention, specifically the compositions of Example 1, and wherein the stabilizer additive comprises calcium ricinoleate.

Samples of compositions A and B of Example 1, in the form of macro-particulate pellets (nominally ⅛" x ⅛" cylinders) are individually fed to a 3-oz. Fellows injection molding machine, and molded at a pressure of 20,000 p.s.i. ½" cushion with cylinder), a mold temperature of about 200° F., and a cycle time of 45 seconds (25 seconds, injection; 15 seconds, die close; 5 seconds, delay) into a center-gated spiral mold having a 3-inch radius from the gate, a semi-circular configuration of ¼" width and ¼" radius, and a total length of 35 inches. Samples are molded at melt temperatures of 415° F., 440° F. and 460° F. The molded pieces have a good surface finish, and no mold deposit is noted even after 8 hours of continuous molding. Also, no fishy odor is detected upon smelling the hot mold or the hot, freshly molded articles. This amine-like or fishy odor can be detected, especially when similarly injection molding at the higher melt temperatures, a 98% trioxane-2% ethylene oxide copolymer modified with 0.5% by weight thereof of the same phenolic antioxidant, and with a thermal stabilizer consisting of 0.1% cyanoguanidine and 0.03% melamine.

EXAMPLE 7

The compositions of this invention are especially valuable in the production of blow-molded articles such as aerosol bottles and the like. Particularly useful in this connection are the acetal terpolymers such as that employed in Example 5 and those disclosed in the aforementioned Heinz et al. application Ser. No. 444,787. At least in such applications these acetal terpolymers are not the full equivalent of the acetal binary polymers, e.g., those employed in Examples 1, 3, 4 and 6.

This example illustrates the production of blow-molded articles of the invention from thermally stabilized molding compositions of the invention.

A molding composition in macro-particulate form (approximately ⅛″ x ⅛″ cylinders) is formulated to provide the same composition as that of composition 5–C (Table III) of Example 5; that is, the same unmodified oxymethylene terpolymer used in said example admixed with 0.1% calcium ricinoleate and 0.5% 2,2′-methylene bis(4-methyl-6-tertiary-butylphenol) and then formed into macro-particles adapted to be molded.

The molding composition is melted in an extruder, extruded through a die in the shape of a long tube, which is blown by air into the desired shape, specifically the shape of a 3-ounce "bullet" aerosol container. The melt temperature (stock temperature) is normally 400° F., but may be within the range of 380°–420° F. Extruder- and die-temperature settings are, for example, as follows: extruder zones 1, 2, 3 and 4: 290° F., 300° F., 350° F. and 350° F., respectively; extruder to die adapter zone, 360° F.; die zone, 360° F.; and orifice heating zone, 350° F. The blow-up ratio (product diameter to relaxed parison diameter) is held to a maximum of 3 to 1. The mold or molds (the latter in the case of multi-cavity operations) are maintained between 200° F. and 260° F. in order to produce containers having maximum surface gloss and mold definition. Gloss can be achieved at a lower mold temperature with some sacrifice of mold definition.

Extended runs have been made following the procedure described above to produce the aforementioned 3-ounce bullet containers. The containers satisfactorily met the following specifications:

|  | Specification | Allowable deviation |
|---|---|---|
| Weight (gram) | 28 | 2.0 |
| Maximum wall thickness (inch) | 0.55 | +0.000 −0.005 |
| Minimum wall thickness (inch) | 0.45 | +0.005 −0.000 |
| Minimum base thickness (inch) | 0.040 |  |

No fishy or amine-like odor is detected when the unfilled containers are smelled.

A series of the above-described containers is filled (A) with unperfumed alcohol and (B) with perfumed alcohol, each container being pressurized with Freon® 114 fluorocarbon. A similar set is prepared wherein the container is blow-molded from an oxymethylene terpolymer composition containing 0.1% cyanoguanidine and 0.03% melamine, based on the weight of the terpolymer. The same unmodified terpolymer is employed in formulating all compositions. Another similar set ("Glass Control") is prepared wherein the container is made of glass. All filled containers are stored for one month at 100° F. The contents are then rated by a panel of experienced odor experts. Their relative ratings and comments are tabulated below:

| Stabilizer | Relative rating* and comment | | |
|---|---|---|---|
|  | With fragrance | | No fragrance— |
|  | Skin | Blotter | skin |
| Glass Control | (1) Clean | (1) Clean | (1) Clean. |
| 0.1% calcium ricinoleate | (2) Clean | do | Do. |
| 0.1% cyanoguanidine + 0.03% melamine | (3) Fishy | (2) Fishy | (2) Fishy. |

*Relative rating for each group of three samples.

EXAMPLE 8

Example 1 is repeated with the exception that instead of the B composition therein described containing 0.2% of calcium ricinoleate, based on the weight of the oxymethylene binary polymer, individual compositions are made containing the same polymer, 0.5% of the same phenolic anti-oxidant, and 0.2% by weight of the said polymer of the following metal salts (alcoholates):

Calcium salt of octyl alcohol
Calcium salt of lauryl alcohol
Magnesium salt of 1-octadecanol
Calcium salt of 1-octadecanol
Strontium salt of 1-octadecanol
Barium salt of 1-octadecanol
Lithium salt of cetyl alcohol
Sodium salt of arachyl alcohol
Potassium salt of ceryl alcohol
Potassium salt of myricyl alcohol
Calcium salt of octamethylene glycol (1,8-octanediol)
Calcium salt of d-linaloöl (d-3,7-dimethyl-1,6-octadien-3-ol)

A similar improvement in thermal stability of the oxymethylene polymer is obtained, and no amine-like or fishy odor is imparted to the stabilized polymer compositions when heated at 230° C. or to molded articles made from such compositions.

Similar results also are obtained when, instead of the binary oxymethylene copolymer used in this example, there is employed the oxymethylene terpolymer used in Examples 5 and 7.

It will be understood, of course, by those skilled in the art that the present invention is not limited to the specific oxymethylene polymers, metal-salt stabilizer or antioxidant, or to the procedures and percentages in formulating the compositions and in forming molded articles therefrom that have been given in the foregoing examples for purpose of illustration. For instance, instead of a copolymer of trioxane with from about 0.1 to about 15 mole percent of ethylene oxide, specifically 2 mole percent, there may be employed binary polymers wherein a corresponding molar percentage of dioxolane is substituted for ethylene oxide in making the copolymer.

Also, various other oxymethylene binary and ternary polymers may be used instead of the particular binary and ternary polymers employed in the various examples, and which are disclosed both broadly and specifically in the aforementioned Heinz et al. application Ser. No. 444,787.

The oxymethylene terpolymers used in the compositions of this invention may be defined as being normally solid, substantially water-insoluble terpolymer of (1) from 75 to 99.9 weight percent of a source of a chain of recurring oxymethylene units, e.g., trioxane; (2) from 0.1 to about 18 weight percent of a bi- or higher multi-functional compound such as a cyclic ether having a single cyclic ether ring having adjacent carbon atoms therein, and having from two to ten carbon atoms in said ring, e.g., ethylene oxide; and (3) from 0.01 to about 7 weight percent of a chain-branching agent having at least two functional oxygen groups and being selected from the group consisting of compounds having at least two cyclic ether rings having from two to ten carbon atoms in each ring, and dialdehydes and diketones having from two to twenty carbon atoms. An example of a chain-branching agent of (3) is a poly(1,2-epoxide), specifically vinyl cyclohexene dioxide. A sub-group of such terpolymers consists of those having, by weight, from about 96.1 to 97.9 percent oxymethylene units, about 2.0 to 2.9 percent of oxyethylene units, and less than about 1%, preferably between about 0.05 and 0.80 percent, of units from the chain-branching agent.

The bi- or higher multi-functional (i.e., at least bifunctional) compounds are compounds having at least two reactive centers such that the compound is capable of reacting in an at least bifunctional manner with the source of oxymethylene units and the chain-branching agent to form a normally solid, thermoplastic, moldable terpolymer. The bi- or higher multi-functional compounds used in making the terpolymers provide —O—R— units interspersed among the oxymethylene groups; R in the grouping —O—R— represents a divalent radical containing at least two carbon atoms directly linked to each other and positioned in the chain between the two valences. Such substituents advantageously are, for instance, hydrocarbon, halohydrocarbon or other groupings that are inert with respect to formaldehyde under the polymerization conditions.

Preferred compounds that are at least bi-functional employed in making the terpolymers include (1) those having at least two functional groups, (2) those having at least one unsaturated bond, (3) those having at least one openable ring structure and (4) combinations of two or more of (1), (2) and (3). Specific examples of compounds that are at least bifunctional, and are preferably cyclic ethers having adjacent carbon atoms, include ethylene oxide, 1,3-dioxolane, and others mentioned hereinbefore, in Walling et al. U.S. Patent No. 3,027,352, the previously cited Kern et al. article, and the aforementioned Heinz et al. application.

The particular chain-branching agents employed may be varied considerably, the chosen agent depending upon such influencing factors as, for example, the particular relationship and conditions under which it is used, its cost, etc. Among suitable chain-branching agents may be mentioned those having at least two functional oxygen groups including (1) cyclic ethers having at least two cyclic ether rings, e.g., 2,2-(trimethylene)bis-1,3-dioxolane, and particularly those compounds having (a) at least two epoxy rings, such as polyepoxides, including diepoxides, triepoxides, etc., (b) at least two formal rings, e.g., pentaerythritol diformal, and (c) at least one epoxy ring and at least one formal ring, e.g., monocrotylidene trimethylolethane monoepoxide; and (2) compounds having at least two oxo groups such as dialdehydes and diketones, e.g., glutaraldehyde, terephthalide and acrolein dimer.

Suitable polyepoxides include those that may be prepared by the epoxidation of compounds having two or more olefinic linkages. Diepoxides of diolefins are usually employed, and the epoxidized olefinic bonds may be of aliphatic or cycloaliphatic structures. More specific examples of diepoxides that may be used include butadiene dioxide, vinylcyclohexane dioxide (1 - epoxyethyl - 3,4-epoxycyclohexane), limonene dioxide, resorcinol, diglycidyl ether, bis-epoxydicyclopentyl ether of ethylene glycol, dicyclopentadiene dioxide and dicrotylidene pentaerythitol diepoxide. Suitable higher polyepoxides include the various triepoxides, e.g., triglycidyl trimethylol propane.

The preferred terpolymers used in practicing the present invention contain (1) oxymethylene groups interspersed with (2) oxyalkylene groups with adjacent carbon atoms derived from the bi- or higher multi-functional compound employed (preferably a cyclic ether having adjacent carbon atoms) and (3) oxyalkylene groups having carbon atoms linked to other chains, the last-named groups being derived from the chain-branching agent. Still more preferred terpolymers are those wherein the oxyalkylene groups of (2), supra, are oxyethylene groups derived by opening the ring structure of a cyclic ether containing oxyethylene groups, e.g., ethylene oxide, 1,3-dioxolane, and the like.

Specific terpolymers that are useful in practicing the present invention include those obtained by copolymerization of the following components in the stated approximate parts by weight:

100 trioxane, 2 ethylene oxide and 0.1 vinylcyclohexene oxide
100 trioxane, 2 ethylene oxide and 0.5 diacetal of malonaldehyde and ethylene glycol
100 trioxane, 2 ethylene oxide and 2 sorbitol triformal
100 trioxane, 2 ethylene oxide and 0.5 vinylcyclohexene oxide
100 trioxane, 2 ethylene oxide and 0.5 butadiene dioxide
100 trioxane, 2 ethylene oxide and 0.3 triepoxide of the triallyl ether of trimethylolpropane
100 trioxane, 12.6 1,3-dioxolane and 0.5 vinylcyclohexene dioxide
100 trioxane, 2 ethylene oxide and 0.5 resorcinol diglycidyl ether
100 trioxane, 2.1 ethylene oxide and 0.5 pentaerythritol diformal
100 trioxane, 2.2 ethylene oxide and 1.0 pentaerythritol diformal
100 trioxane, 16.8 1,3-dioxolane and 0.5 vinylcylcohexene dioxide
100 trioxane, 2 ethylene oxide and 0.1 diglycidyl ether of bisphenol A These terpolymers may be thermally stabilized by admixing with a stabilizing additive comprising a metal salt of the kind used in practicing this invention and in the manner broadly described hereinbefore and specifically illustrated in the various examples. The stabilized compositions may be converted into molding compositions and molded to yield molded articles that are free from an amino-like or fishy odor when tested as herein set forth.

For instance, the above-described stabilized oxymethylene terpolymer compositions (as well as other oxymethylene polymer compositions of the invention) may be molded, in a typical blow-molding operation, into 4-ounce Boston round bottles using a 2″ extruder having an L/D ratio of 14/1, a die bushing I.D. of 0.562″, a die mandrel O.D. of 0.200″, a land length of 0.5″, a die temperature of 340° F., a melt temperature of 380° F., a mold temperature of 230° F. and a 20–22 second cycle.

In a typical extrusion operation using the stabilized compositions of the instant invention, including more specifically one or another of the above-described terpolymer compositions, a 1″ I.D. pipe having a 0.08″ wall is extruded through a 2½″ Davis Standard Extrusion Machine having a die bushing of 1.200″ I.D. and a die mandrel of 1.035″ O.D. There is an external sleeve 9″ long and of 1.235″ I.D. adjacent to the die bushing and concentric with it. The sleeve controls the outer diameter of the pipe while the inner diameter is controlled by the draw rate. A temperature of 400° F. is maintained at the die and a temperature of 175° F. is maintained at the sleeve. Air pressure in the extruded pipe is maintained at 23 p.s.i.g., and the pipe is taken up at the rate of 6½ feet per minute.

It is to be understood that the foregoing detailed description is given merely by way of illustration and that many variations may be made therein without departing from the spirit and scope of the invention.

The embodiments of the invention in which an exclusive property or privilege is claimed are defined as follows:

1. A substantially homogeneous polyoxymethylene composition free of nitrogen-containing stabilizers comprising:
   (A) a previously prepared, normally solid, substantially water insoluble polymer containing at least 60 mol percent of recurring oxymethylene groups; said polymer having a number average molecular weight of at least 10,000 and a melting point of at least 150° C. and (B) from about 0.05 to about 5 weight percent of said polymer of a phenolic stabilizer and (C) a small, positive, stabilizing amount up to about 5 percent by weight of a stabilizing additive selected from the group consisting of metal salts of non nitrogenous organic acids having from 2 to 30 carbon atoms and at least one carboxy group and a member selected from the group consisting of metal salts of non-nitrogenous alcohols having from 2 to 30 carbon atoms, wherein the metal is selected from the group consisting of alkali metals, alkaline-earth metals, zinc, aluminum, and tin and said metal salts of non-nitrogenous organic acids and alcohols are formic acid acceptors.

2. The composition of claim 1, wherein said polymer is an oxymethylene copolymer comprising 85 percent to about 99.9 weight percent recurring —$OCH_2$—groups interspersed with groups of the formula:

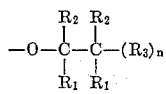

wherein each $R_1$ and $R_2$ is selected from the group consisting of hydrogen, lower alkyl and halogen-substituted lower alkyl radicals, each $R_3$ is selected from the group consisting of methylene, oxymethylene, lower alkyl and haloalkyl-substituted methylene, and lower alkyl and haloalkyl-substituted oxymethylene radicals and $n$ is an integer from zero to three, inclusive, each lower alkyl radical having from one to two carbon atoms, inclusive, said —$OCH_2$— groups consisting from 85 percent to 99.9 percent of the recurring units and said groups represented by the formula:

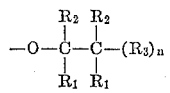

being incorporated during the step of copolymerization to produce said copolymer by the opening up of the ring of a cyclic ether having adjacent carbon atoms by the breaking of an oxygen-to-carbon linkage.

3. The composition of claim 2, wherein said cyclic ether is represented by the formula:

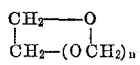

wherein $n$ represents an integer from zero to two.

4. The composition of claim 1, wherein said metal is calcium.

5. The composition of claim 1, wherein said metal is barium.

6. The composition of claim 1, wherein said stabilizing additive is a ricinoleate of an alkaline earth metal.

7. The composition of claim 1, wherein said stabilizing additive is calcium ricinoleate.

8. The composition of claim 7, wherein said phenolic stabilizer is 2,2'-methylene bis(4-methyl-6-tertiary butylphenol).

9. A composition as in claim 1 wherein the polymer of A is an oxymethylene homopolymer.

10. A composition as in claim 1 wherein the polymer of A is an oxymethylene copolymer.

11. A composition as in claim 10 wherein the oxymethylene copolymer (component A) of the admixture is a normally solid, substantially water-insoluble terpolymer of (1) from 75 to 99.9 weight percent of trioxane;
(2) from 0.1 to about 18 weight percent of ethylene oxide; and
(3) from 0.01 to about 7 weight percent of a chain-branching agent having at least two functional oxygen groups and being selected from the group consisting of compounds having at least two cyclic ether rings having from two to ten carbon atoms in each ring, and dialdehydes and diketones having from two to twenty carbon atoms;

and component C of the admixture is stabilizing additive comprising (a) calcium ricinoleate in a stabilizing amount within the range of from 0.05 to about 1.5 percent by weight of the said copolymer, and
(b) from 0.05 to about 2 percent, by weight of the said copolymer, of 2,2'-methylene bis(4-methyl-6-tertiary-butylphenol) as an antioxidant.

12. A composition as in claim 11 wherein the chain-branching agent of (3) is butanediol diglycidyl ether.

References Cited

UNITED STATES PATENTS

| | | | |
|---|---|---|---|
| 3,366,561 | 1/1968 | Marans | 260—67 X |
| 3,344,119 | 9/1967 | Schweitzer et al. | 260—67 |
| 3,340,219 | 9/1967 | Stemmler | 260—18 X |
| 3,275,604 | 9/1966 | Kray et al. | 260—67 |
| 3,271,369 | 9/1966 | Kern et al. | 260—67 |
| 3,240,753 | 3/1966 | Dolce | 260—67 X |
| 3,236,929 | 2/1966 | Jupa et al. | |
| 3,087,913 | 4/1963 | Kray et al. | 260—45.95 X |
| 2,871,220 | 1/1959 | Macdonald | 260—45.95 |

OTHER REFERENCES

Chemical Abstracts 56:589i: "Stabilization of Acetylated Polyformaldehyde by Copper or Manganese Salts."

"Hydrocarbon Processing and Petroleum Refiner," Vol. 41, No. 11, November 1962, pp. 131, 169, Sittig.

DONALD E. CZAJA, Primary Examiner

C. WARREN IVY, Assistant Examiner

U.S. Cl. X.R.

260—45.75, 45.85, 45.95, 67